UNITED STATES PATENT OFFICE.

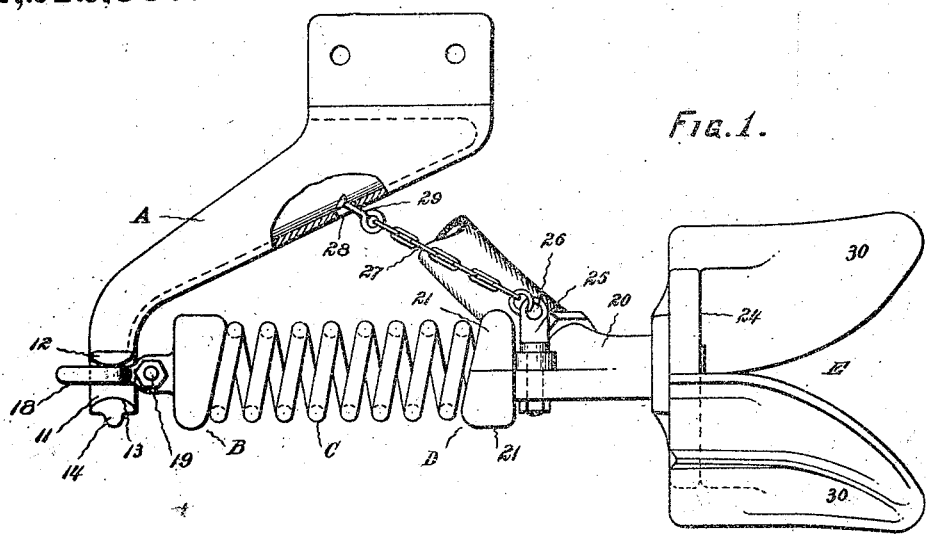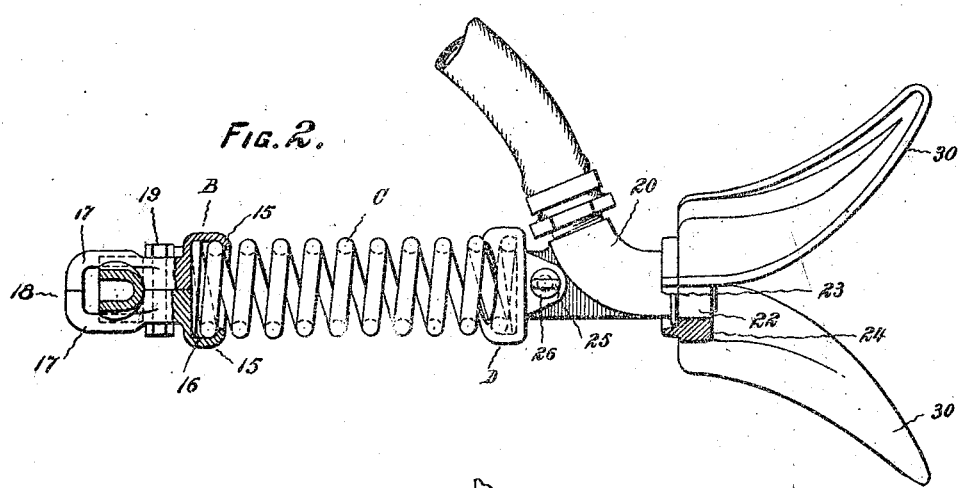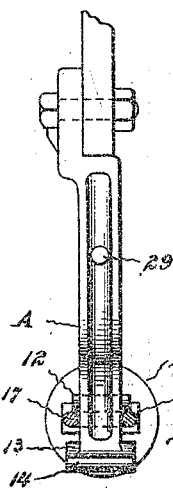

JOSEPH V. ROBINSON, OF CHEVY CHASE, MARYLAND.

AUTOMATIC TRAIN-PIPE CONNECTOR.

1,212,560.  Specification of Letters Patent.  Patented Jan. 16, 1917.

Application filed October 15, 1914. Serial No. 866,824.

*To all whom it may concern:*

Be it known that I, JOSEPH V. ROBINSON, a citizen of the United States, and resident of Chevy Chase, county of Montgomery, State of Maryland, have invented certain new and useful Improvements in Automatic Train-Pipe Connectors, of which the following is a specification.

My invention has for its object to provide an improved support for the coupling head of train pipe connectors which will be simple, strong and efficient and will permit universal movement of the coupling head with the minimum resistance.

The invention relates more particularly to that type of support in which the coupling head is held against downward movement until coupled. Such constructions heretofore have been found objectionable in that when coupling on curves of different heights the faces of the coupling heads engage at an angle to each other, imposing undue strain to the various parts of the connector and rendering a satisfactory joint difficult to obtain. My improvement removes these objections by providing a construction in which the head is normally supported against downward movement by a chain but which, nevertheless, may yield in the downward direction during the coupling act.

With this and other objects in view, my invention consists in the combinations, improvements and constructions hereinafter described, pointed out in the appended claims and illustrated in the accompanying drawings, in which:

Figure 1, is a side elevation of my improved support. Fig. 2, is a plan view thereof showing some of the parts in section, and Fig. 3, is a rear view of the base A.

Referring to the drawings: I provide a base A, preferably U-shape in cross section, and this I secure in any suitable manner to the usual car coupler. At its lower end I provide the base with a portion 11 leading from a shoulder 12 and terminating in a stop or finger 14 extending laterally of said portion 11 in the horizontal plane and having a rounded upper surface 13, as shown.

A seat B comprising halves 15, each having on its inner face a semi-circumferential groove 16 and having on its rear face a curved portion 17, which when the two halves are assembled constitutes an eye 18 having an elongated opening, as shown, is loosely mounted on base A with said eye normally bearing against said portion 11 and lying between said shoulder 12 and the stop 14. One end of a helical buffer spring C is mounted in the groove 16 of the seat B, which groove conforms to the contour of the base coil of the spring, and is locked therein by a bolt 19 which clamps the halves 15 together about said spring. The seat B is assembled in place on the base A by making the elongated opening in the eye 18 of greater length and width than the finger or stop 14, so that by turning the eye crosswise of the base it may be readily assembled thereon.

At the forward end of the spring C I provide a hollow curved fitting or fluid conduit 20 integral with which is one member of a second seat D comprising halves 21 provided on their inner faces with semi-circumferential grooves in which said spring is snugly seated and locked, as in the case of the seat B. One end of the conduit terminates in a head 22 upon which the coupling head E of my improvement is mounted, the conduit being pressed into and through the head. A suitable rubber gasket 23 is mounted in the head 22 of the conduit and extends in advance of the coupling face 24 of the head E and is adapted to mate with a companion gasket of an opposing coupling. To support the head in the normal horizontal position, I provide the bolt 25, which locks together the halves 21 of said seat D, with an eye 26, the bolt being positioned between the curved fitting 20 and seat so that it is a considerable distance from the rear of the coupling head E. Into the eye 26 I secure one end of a chain 27 and the other end of the chain I connect with the base A, as at 28, the connection consisting of an eye bolt 29 suitably connected to the base.

When two cars equipped with my improvement come together in the act of coupling, the conduits 20 and gaskets 23 will be alined by the guiding prongs 30 of the coupling heads E. Should one car be higher than the other during this operation, the head of the connector on the higher car will tilt downwardly with the eye 26 of the bolt 25 as the fulcrum point while the lower head will tilt upwardly so that when the faces of the heads meet they will be practically parallel. During such downward tilting of the coupling head E, the conduit 20 will be held against shifting bodily in the downward direction by the chain 27 and this will cause the spring C to yield in the upward direction approximately at its center, permitting the required downward movement of the head E. During this operation the rear end of the spring C will be held against upward movement by engagement of the eye 18 with the shoulder 12.

When the faces of the coupling heads are thus alined further movement of the cars will shift the coupling heads rearwardly against the tension of the buffer spring C, providing sufficient slack in the chain 27 to permit free universal movement of the heads when in the coupled position. The springs C should of course be constructed of stock which will give sufficient stiffness to the spring to prevent lateral deflection thereof in taking curves, etc. when the connectors are coupled up in service. This construction of support offers the minimum resistance to movement of the coupling heads when either in the coupled or uncoupled position, the only resistance to such movement when the heads are coupled and the springs compressed to provide slack in the chains 27 being the friction between the eye 18 and the portion 12 of the base A. As appears in the drawings, the spring C is the only means which connects together the seats B and D.

Having thus described my said invention, what I claim as new and desire to secure by United States Letters Patent is:

1. In an automatic train pipe connector, the combination of a coupling head, a fluid conduit extending from said head and provided with a seat arranged at one side of the conduit and having on its inner face a semi-circumferential groove, a spring mounted in said groove for extending and placing said head under pressure, means for securing the spring in said groove, and a base against which said spring acts in service.

2. In an automatic train pipe connector, the combination of a coupling head, a fluid conduit extending from said head and provided with a seat arranged at one side of the conduit and having on its inner face a semi-circumferential groove, a spring mounted in said groove, means for locking the spring in the groove, a second seat for the spring and in which the spring is mounted, and a base by which said second seat is carried.

3. In an automatic train pipe connector, the combination of a coupling head, a fluid conduit extending from said head and provided with a seat comprising halves each half having on its inner face a semi-circumferential groove, a spring secured between said halves, a second seat for said spring comprising halves each having on its inner face a semi-circumferential groove, means for securing said spring between such halves, and a base on which said second seat is loosely mounted.

4. In an automatic train pipe connector, the combination of a coupling head, a fluid conduit extending from said head and provided with a seat, a second seat, a base by which said second seat is carried, flexible means connected with said conduit for supporting said head against downward movement from the uncoupled position, and a spring interposed between said seats and mounted therein for extending said head, said spring being adapted to permit tilting of the head downwardly from the uncoupled position with the point of connection of said flexible means with said conduit as the fulcrum.

5. In an automatic train pipe connector, the combination of a coupling head, a fluid conduit extending from said head and provided with a seat, a spring secured in said seat, a second seat in which said spring is secured, a base by which said second seat is carried, and means for causing said spring to yield upwardly intermediate its ends when opposing connectors couple up under a condition of vertical disalinement.

6. In an automatic train pipe coupling, the combination of a coupling head, a fluid conduit extending from said head, a spring acting against said conduit, a seat comprising halves each having on its inner face a semi-circumferential groove in which said spring is mounted, a base, and a portion on said seat for embracing said base.

7. In an automatic train pipe coupling, the combination of a coupling head, a conduit extending from said head, a seat connected with the head and provided with a semi-circumferential groove, a base, a second seat carried by said base and having also a semi-circumferential groove, the seat being separate of said base, a spring interposed between said seats and mounted in said grooves and constituting the only means of connecting the seats, and means for locking said spring in said grooves.

8. In an automatic train pipe coupling, the combination of a coupling head, a fluid conduit extending through said head and provided with a gasket, a seat on said conduit at the rear of said head, said seat comprising halves each having on its inner face a semi-circumferential groove, a second seat also comprising halves each of which has on its inner face a semi-circumferential groove, a base, portions on the halves of said last mentioned seat which when the halves are secured together constitute an eye for loosely embracing said base, a spring mounted in the groove of each of said seats, means for locking the spring in said grooves, and means for normally supporting said head against downward movement from the uncoupled position but permitting universal movement of the head when in the coupled position.

9. In an automatic train pipe connector, the combination of a coupling head, a fluid conduit therefor, a spring acting against the rear face of said conduit, a base, a seat for said spring carried by said base and on which seat said spring is mounted, a portion carried by said seat for embracing said base, and means for preventing bodily shifting of said conduit downwardly from the normal uncoupled position.

In testimony whereof, I have hereunto set my hand in the presence of two witnesses.

JOSEPH V. ROBINSON.

In the presence of—
 KATHERINE V. BOSWELL,
 M. C. SHERIDAN.